United States Patent [19]

Takeo

[11] Patent Number: 5,502,775
[45] Date of Patent: Mar. 26, 1996

[54] METHOD AND APPARATUS FOR ADJUSTING READ-OUT AND PROCESSING CONDITIONS FOR RADIATION IMAGES

[75] Inventor: Hideya Takeo, Kanagawa, Japan

[73] Assignee: Fuji Photo Film Co., Ltd., Kanagawa, Japan

[21] Appl. No.: 997,566

[22] Filed: Dec. 28, 1992

[30] Foreign Application Priority Data

Dec. 26, 1991 [JP] Japan .................................. 3-345172

[51] Int. Cl.$^6$ .................................................. G06F 159/00
[52] U.S. Cl. ........................................... 382/169; 382/156
[58] Field of Search ........................ 364/413.13, 413.18, 364/413.22; 250/327.2, 484.1, 484.2; 382/9, 10, 14, 48, 61, 159, 161, 6; 395/2

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.1 |
| 4,315,318 | 2/1982 | Kato et al. | 250/337 |
| 4,387,428 | 6/1983 | Ishida et al. | 250/337 |
| 4,638,162 | 1/1987 | Tanaka et al. | 250/327.2 |
| 4,682,028 | 7/1987 | Tanaka et al. | 250/327.2 |
| 4,814,619 | 3/1989 | Katsuda et al. | 250/327.2 |
| 4,829,181 | 5/1989 | Shimura | 250/327.2 |
| 4,851,678 | 7/1989 | Adachi et al. | 250/327.2 |
| 4,887,305 | 12/1989 | Shimura | 250/327.2 |
| 4,903,310 | 2/1990 | Takeo et al. | 364/413.13 |
| 4,931,644 | 6/1990 | Adachi et al. | 250/327.2 |
| 4,950,894 | 8/1990 | Hara et al. | 250/327.2 |
| 4,962,539 | 10/1990 | Takeo et al. | 382/9 |
| 4,967,079 | 10/1990 | Shimura | 250/327.2 |
| 5,028,784 | 7/1991 | Arakawa et al. | 250/327.2 |
| 5,042,074 | 8/1991 | Takeo et al. | 382/9 |
| 5,157,733 | 10/1992 | Takeo et al. | 382/6 |
| 5,278,755 | 1/1994 | Takeo | 364/413.13 |

FOREIGN PATENT DOCUMENTS

| | | |
|---|---|---|
| 56-11395 | 2/1981 | Japan . |
| 61-5193 | 2/1986 | Japan . |
| 61-280163 | 12/1986 | Japan . |
| 2272530 | 11/1990 | Japan . |
| 2275429 | 11/1990 | Japan . |
| 2275432 | 11/1990 | Japan . |
| 2275435 | 11/1990 | Japan . |
| 2267679 | 11/1990 | Japan . |
| 2296235 | 12/1990 | Japan . |

OTHER PUBLICATIONS

English abstract of Japanese Patent Publication No. 61-5193.

"Learning Internal Representations by Error Propagation", *Parallel Distributed Processing*, D. E. Rumelhart et al, vol. 1, D. E. Rumelhart and J. L. McClell and the PDP Research Group, 1986, pp. 318–362.

Primary Examiner—Gail O. Hayes
Assistant Examiner—Frantzy Poinvil
Attorney, Agent, or Firm—Sughrue, Mion, Zinn, Macpeak & Seas

[57] ABSTRACT

A first image signal representing a radiation image is detected from a stimulable phosphor sheet, on which the radiation image has been stored, its probability density function is created, and a characteristic value of the probability density function is detected. Values of differences between the characteristic value and values of the first image signal in the probability density function are calculated. Information representing the values of the differences is fed into a neural network, and information representing temporary read-out conditions and/or temporary image processing conditions is fed out from the neural network. The temporary read-out conditions and/or the temporary image processing conditions are corrected in accordance with the level of the characteristic value. Read-out conditions, under which a second image signal representing the radiation image is to be obtained from the stimulable phosphor sheet, and/or image processing conditions, under which the second image signal having been obtained is to be image processed, are thereby adjusted.

12 Claims, 4 Drawing Sheets

FIG.1

METHOD AND APPARATUS FOR ADJUSTING READ-OUT AND PROCESSING CONDITIONS FOR RADIATION IMAGES

BACKGROUND OF THE INVENTION

1. Field of the Invention

This invention relates to a method and apparatus for adjusting read-out conditions and/or image processing conditions for a radiation image, wherein read-out conditions, under which an image signal is to be obtained, and/or image processing conditions, under which the obtained image signal is to be processed, are adjusted on the basis of an image signal representing the radiation image. This invention also relates to a radiation image analyzing method, wherein a subdivision pattern of radiation images, the shape and location of an irradiation field, an orientation in which an object was placed when the image of the object was recorded, and/or a portion of an object the image of which was recorded is determined from an image signal representing a radiation image, and a radiation image analyzing apparatus for generating characteristic measures representing the results of the determination.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order for an image signal to be detected accurately, certain factors which affect the image signal must be set in accordance with the dose of radiation delivered to the stimulable phosphor sheet and the like. Novel radiation image recording and reproducing systems which accurately detect an image signal have been proposed. The proposed radiation image recording and reproducing systems are constituted such that a preliminary read-out operation (hereinafter simply referred to as the "preliminary readout") is carried out in order approximately to ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as the "final readout") is carried out to obtain the image signal, which is to be used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain and a scale factor which define the relationship between the input to the read-out means and the output therefrom, or to the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The term "image processing conditions" as used herein means a group of various factors, which are adjustable and set when an image signal is subjected to processing, which affects the gradation, sensitivity, or the like, of a visible image reproduced from the image signal. The proposed method is applicable to cases where an image signal is obtained from a radiation image recorded on a recording medium such as conventional X-ray film, as well as to systems using stimulable phosphor sheets.

As disclosed in, for example, U.S. Pat. No. 4,638,162 and Japanese Unexamined Patent Publication No. 61(1986)-280163, operations for calculating the values of the read-out conditions for the final readout and/or the image processing conditions are carried out by a group of algorithms which analyze an image signal (or a preliminary read-out image signal). A large number of image signals detected from a large number of radiation images are statistically processed. The algorithms which calculate the read-out conditions for the final readout and/or the image processing conditions are designed on the basis of the results obtained from this processing.

As examples of the algorithms which have heretofore been employed, methods are known wherein a probability density function of an image signal is created and analyzed, and the read-out conditions for the final readout and/or the image processing conditions are determined on the basis of the results of the analysis of the probability density function. Methods for determining the read-out conditions for the final read-out and/or the image processing conditions on the basis of the results of an analysis of the probability density function of an image signal can be classified into the following:

(1) a method as disclosed in U.S. Pat. No. 4,682,028 wherein both the maximum value and the minimum value in the range resulting in a reproduced visible image containing the necessary image information are determined from a probability density function of an image signal, and, for example, the read-out conditions for the final readout are set such that, during the final readout, the image information represented by values of the emitted light signal falling within the range of the maximum value to the minimum value is detected accurately, (2) a method as disclosed in U.S. Pat. No. 4,638,162 wherein only the maximum value is determined from a probability density function of an image signal, a value obtained by subtracting a predetermined value from the maximum value is taken as the minimum value, and the range between the maximum value and the minimum value is taken as the range resulting in a visible image containing the necessary image information, (3) a method as disclosed in Japanese Unexamined Patent Publication No. 61(1986)-280163 wherein only the minimum value is determined from a probability density function of an image signal, a value obtained by adding a predetermined value to the minimum value is taken as the maximum value, and the range between the minimum value and the maximum value is taken as the range resulting in a visible image containing the necessary image information, (4) a method as proposed in U.S. Pat. No. 4,887,305 wherein a difference probability density function is used, (5) a method as disclosed in U.S. Pat. No. 4,950,894 wherein a cumulative probability density function is used, and (6) a method as proposed in U.S. patent application Ser. No. 784,744 wherein a probability density function is divided into a plurality of small regions by using a discrimination standard.

The range of an image signal resulting in a visible image containing the necessary image information is determined with one of various methods, and the read-out conditions for the final readout and/or the image processing conditions are set with respect to said range.

However, in cases where the read-out conditions for the final readout and/or the image processing conditions are calculated on the basis of the results of an analysis of the image signal in the manner described above and the image signal is detected from a recording medium, on which the irradiation field was limited during the recording of the radiation image, the radiation image cannot be ascertained accurately if the image signal is analyzed without the shape and location of the irradiation field being taken into consideration. As a result, incorrect read-out conditions and/or an incorrect image processing conditions are set, and it becomes impossible to reproduce a visible radiation image which has good image quality and can serve as an effective tool in, particularly, the efficient and accurate diagnosis of an illness.

In order to eliminate the aforesaid problem, it is necessary to determine the shape and location of an irradiation field and then to calculate the read-out conditions for the final readout and/or the image processing conditions on the basis of only the image signal representing image information stored in the region inside of the irradiation field.

The applicant has proposed various methods for determining the shape and location of an irradiation field as disclosed in, for example, U.S. Pat. Nos. 4,851,678, 4,931, 644, and 4,967,079. The aforesaid problems can be eliminated by automatically determining the shape and location of the irradiation field by use of the proposed methods, and setting the read-out conditions for the final readout and/or the image processing conditions only for the region inside of the irradiation field thus found.

When radiation images are recorded on recording media, subdivision image recording is often carried out. With the subdivision image recording, the recording region on a single recording medium is divided into a plurality of predetermined subdivisions, and the respective subdivisions are exposed to radiation for image recording. The subdivision image recording is economical since, for example, when images of small object portions are recorded on large recording media, images of a plurality of object portions can be recorded on a single recording medium. Also, the speed with which radiation images are recorded and read out can be kept high.

However, in cases where irradiation fields are limited when the subdivision image recording described above is carried out on a single recording medium, the respective irradiation fields become separated from each other on the recording medium. In such cases, the shapes and locations of the irradiation fields cannot be determined accurately. A method for automatically determining the shapes and locations of a plurality of irradiation fields on a single recording medium has also been proposed. However, with the proposed method, the algorithms for determining the shapes and locations of irradiation fields become very complicated, and a very expensive apparatus is necessary for carrying out the method.

If information concerning the positions of the respective subdivisions is given by manually entering the information representing a subdivision pattern on the recording medium into an apparatus for determining the shape and location of an irradiation field when the shapes and locations of the irradiation fields are to be detected, an operation for detecting a single irradiation field in each subdivision may be carried out. Therefore, the problems in that the algorithms for determining the shapes and locations of the irradiation fields become very complicated can be eliminated. However, considerable time and labor are required to enter the information concerning the subdivision pattern each time radiation images are read out from a recording medium.

Accordingly, a need exists for a method with which a subdivision pattern of radiation images recorded on a recording medium can be determined automatically. The applicant proposed various methods for automatically determining a subdivision pattern of radiation images which have been recorded on a recording medium in, for example, Japanese Unexamined Pat. Publication Nos. 2(1990)-267679, 2(1990)-275429, 2(1990)-275432, 2(1990)-275435, 2(1990)-296235 and U.S. Pat. Nos. 4,829,181, 4,962,539, 5,028,784.

Also, in cases where the read-out conditions for the final readout and/or the image processing conditions are determined in the manner described above, it often occurs that, when radiation images of a single object were recorded on recording media with the object being placed in different orientations, the image density of a region of interest in the object varies for visible images reproduced from the radiation images.

For example, when the thoracic vertebrae of a human body are to be diagnosed, radiation images of the chest of the human body are recorded on stimulable phosphor sheets from the front and a side of the chest. In cases where the radiation image of the chest is recorded from the front of the chest, the thoracic vertebrae, which are the region of interest, overlap the mediastinum region, through which the radiation cannot pass easily. Therefore, in such cases, the amount of energy stored on part of the stimulable phosphor sheet corresponding to the thoracic vertebrae during its exposure to the radiation is comparatively small. As a result, when the stimulable phosphor sheet, on which the frontal chest image has been stored, is exposed to stimulating rays during the operation for reading out the radiation image, the part of the stimulable phosphor sheet corresponding to the thoracic vertebrae emits a comparatively small amount of light. On the other hand, in cases where the radiation image of the chest is recorded from the side of the chest, the thoracic vertebrae, which are the region of interest, overlap the lung fields, through which the radiation can pass easily. Therefore, in such cases, the amount of energy stored on part of the stimulable phosphor sheet corresponding to the thoracic vertebrae during its exposure to the radiation is comparatively large. As a result, when the stimulable phosphor sheet, on which the lateral chest image has been stored, is exposed to stimulating rays during the operation for reading out the radiation image, the part of the stimulable phosphor sheet corresponding to the thoracic vertebrae emits a comparatively large amount of light. Also, the maximum value and the minimum value of the image signal detected from the stimulable phosphor sheet do not much vary for the frontal chest image and the lateral chest image. Therefore, when the read-out conditions for the final readout and/or the image processing conditions are adjusted with conventional techniques in accordance with the maximum value and the minimum value of the image signal detected from the stimulable phosphor sheet, approximately the same values of the read-out conditions for the final readout and/or approximately the same values of the image processing conditions are set for the frontal chest image and the lateral chest image. Accordingly, if image signals are detected from the frontal chest image and the lateral chest image under the thus set read-out conditions for the final readout and visible images are reproduced from the detected image signals, and/or if the image signals detected from the frontal chest image and the lateral chest image are processed under the thus set image processing conditions and visible images are reproduced from the processed image signals, the image density of the patterns of the thoracic vertebrae in the visible image reproduced from the frontal chest image becomes comparatively low, and the image density of the patterns of the thoracic vertebrae in the visible image reproduced from the lateral chest image becomes comparatively high.

In order for the aforesaid problems to be eliminated, information concerning in what orientation the object was placed when the image of the object was recorded has heretofore been entered into an image read-out apparatus or an image processing unit each time the radiation image is read out from a stimulable phosphor sheet. The read-out conditions for the final readout and/or the image processing conditions are set in accordance with the entered information concerning the orientation in which the object was placed when the image of the object was recorded.

However, considerable time and labor are required to enter the information concerning the orientation, in which the object was placed when the image of the object was recorded, each time a radiation image is read out from a stimulable phosphor sheet. Also, it will easily occur that incorrect information concerning the orientation, in which the object was placed when the image of the object was recorded, is entered.

Therefore, a method for automatically determining the orientation, in which the object was placed when the medical image of the object was recorded on a stimulable phosphor sheet, or the like, has been proposed in, for example, U.S. Pat. No. 4,903,310.

Additionally, for the same reasons as those described above, in cases where the read-out conditions for the final readout and/or the image processing conditions are determined in the manner described above, it often occurs that the image density of a region of interest in an object varies in a reproduced visible image, depending on what portion of the object was recorded (e.g., the head, the neck, the chest, or the abdomen in cases where the object is a human body). In order for such problems to be eliminated, information concerning what portion of the object was recorded has heretofore been entered into an image read-out apparatus or an image processing unit each time the radiation image is read out from a stimulable phosphor sheet. The read-out conditions for the final readout and/or the image processing conditions are set in accordance with the entered information concerning the portion of the object the image of which was recorded.

As described above, when the read-out conditions for the final readout and/or the image processing conditions are set, it is necessary to determine a subdivision pattern of radiation images, the shape and location of an irradiation field, an orientation in which an object was placed when the image of the object was recorded, a portion of an object the image of which was recorded, or the like. A correction should then be made in accordance with the results of the determination. Thereafter, appropriate read-out conditions for the final readout and/or appropriate image processing conditions should be set.

Recently, a method for utilizing a neural network has been proposed and is being used in various fields.

The neural network is provided with a learning function by a back propagation method. Specifically, when information (an instructor signal), which represents whether an output signal obtained when an input signal is given is or is not correct, is fed into the neural network, the weights of connections between units in the neural network (i.e. the weights of synapse connections) are corrected. By repeating the learning operation of the neural network, the probability that a correct answer will be obtained in response to a new input signal can be kept high.

By feeding an image signal representing a radiation image into the neural network, the read-out conditions for the final readout and/or the image processing conditions described above can be set with the neural network. Also, the determination of a subdivision pattern of radiation images, the shape and location of an irradiation field, an orientation in which an object was placed when the image of the object was recorded, a portion of an object the image of which was recorded, or the like, can be carried out with the neural network. A correction can then be made in accordance with the results of the determination. Thereafter, appropriate read-out conditions for the final readout and/or appropriate image processing conditions can be set.

Specifically, an image signal representing a radiation image is fed into the neural network. From the neural network, outputs representing characteristic measures, which indicate the read-out conditions for the final readout, the image processing conditions, and/or the results of the determination of various items, are obtained. By repeating the learning operation of the neural network, characteristic measures more accurately representing the read-out conditions for the final readout, the image processing conditions, and/or the results of the determination of various items can be obtained.

However, with the aforesaid method for analyzing the probability density function of an image signal and adjusting the read-out conditions for the final readout and/or the image processing conditions on the basis of the results of the analysis of the probability density function, various characteristic values are calculated by carrying out a threshold value process and a local analysis of the probability density function. Therefore, too much importance is attached to local features of the probability density function, and incorrect results are often obtained.

Also, with the above-described method for adjusting the read-out conditions for the final readout and/or the image processing conditions by utilizing a neural network, a local analysis is not carried out, and therefore the problems can be prevented from occurring in that too much importance is attached to local features and incorrect results are often obtained. However, an image signal is directly fed into the neural network, and the learning operation of the neural network is carried out repeatedly. Therefore, a very long period of time is required for the learning operation. This is not advantageous in practice.

SUMMARY OF THE INVENTION

The primary object of the present invention is to provide a method for adjusting read-out conditions and/or image processing conditions for a radiation image, wherein drawbacks of a method utilizing a probability density function of an image signal and a method utilizing a neural network are eliminated, a neural network capable of making judgments in broad aspects is utilized, and read-out conditions for a final readout and/or image processing conditions are adjusted efficiently and accurately by the neural network such that a learning operation of the neural network may be repeated only a few times.

Another object of the present invention is to provide an apparatus for carrying out the method for adjusting read-out conditions and/or image processing conditions for a radiation image.

A further object of the present invention is to provide a radiation image analyzing method, wherein drawbacks of a method utilizing a probability density function of an image signal and a method utilizing a neural network are eliminated, a neural network capable of making judgments in broad aspects is utilized, and a subdivision pattern of radiation images, the shape and location of an irradiation field, an orientation in which an object was placed when the image of the object was recorded, and/or a portion of an object the image of which was recorded is determined efficiently and accurately by the neural network such that a learning operation of the neural network may be repeated only a few times.

A still further object of the present invention is to provide an apparatus for carrying out the radiation image analyzing method.

A method for adjusting read-out conditions and/or image processing conditions for a radiation image in accordance with the present invention is applicable when a stimulable phosphor sheet is used and the preliminary readout is carried out.

Specifically, the present invention provides a method for adjusting read-out conditions and/or image processing conditions for a radiation image, wherein a first image signal representing a radiation image is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for a radiation image comprising the steps of:

i) creating a probability density function of the first image signal, ii) detecting a predetermined characteristic value of the first image signal from the probability density function, iii) calculating a value of a difference between the characteristic value and each of values of the first image signal in the probability density function, the calculation being carried out for the whole first image signal, iv) feeding information representing the values of the differences, which have been calculated for the whole first image signal, into a neural network, which receives the information representing the values of the differences and generates outputs representing temporary read-out conditions and/or temporary image processing conditions, information representing the temporary read-out conditions and/ or the temporary image processing conditions being thereby fed out from the neural network, and v) correcting the temporary read-out conditions and/or the temporary image processing conditions, which have been obtained from the neural network, in accordance with a level of the characteristic value, whereby the read-out conditions, under which the second image signal is to be obtained, and/or the image processing conditions, under which the second image signal having been obtained is to be image processed, are adjusted.

The term "characteristic value" as used herein means a value representing a feature of the image signal, such as the maximum value of the image signal in the probability density function, the minimum value of the image signal in the probability density function, the maximum value of the image signal in the probability density function, which value represents the maximum amount of light emitted by a region other than a background region on the stimulable phosphor sheet, or the mean value of the maximum and minimum values of the image signal.

The present invention also provides an apparatus for carrying out the method for adjusting read-out conditions and/or image processing conditions for a radiation image in accordance with the present invention.

Specifically, the present invention also provides an apparatus for adjusting read-out conditions and/or image processing conditions for a radiation image, wherein a first image signal representing a radiation image is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for a radiation image comprising:

i) an operation means for creating a probability density function of the first image signal, detecting a predetermined characteristic value of the first image signal from the probability density function, and calculating a value of a difference between the characteristic value and each of values of the first image signal in the probability density function, the calculation being carried out for the whole first image signal, ii) a neural network for receiving information representing the values of the differences, which have been calculated by the operation means for the whole first image signal, and generating outputs, which represent temporary read-out conditions and/or temporary image processing conditions, in accordance with the values of the differences, and iii) a correction means for correcting the temporary read-out conditions and/or the temporary image processing conditions, which have been obtained from the neural network, in accordance with a level of the characteristic value.

The present invention further provides a method for adjusting image processing conditions for a radiation image, wherein image processing conditions, under which an image signal representing a radiation image is to be image processed, are adjusted on the basis of the image signal, the method for adjusting image processing conditions for a radiation image comprising the steps of:

i) creating a probability density function of the image signal, ii) detecting a predetermined characteristic value of the image signal from the probability density function, iii) calculating a value of a difference between the characteristic value and each of values of the image signal in the probability density function, the calculation being carried out for the whole image signal, iv) feeding information representing the values of the differences, which have been calculated for the whole image signal, into a neural network, which receives the information representing the values of the differences and generates outputs representing temporary image processing conditions, information representing the temporary image processing conditions being thereby fed out from the neural network, and v) correcting the temporary image processing conditions, which have been obtained from the neural network, in accordance with a level of the characteristic value, whereby the image processing conditions, under which the image signal is to be image processed, are adjusted.

The present invention still further provides an apparatus for carrying out the method for adjusting image processing conditions for a radiation image in accordance with the present invention.

Specifically, the present invention still further provides an apparatus for adjusting image processing conditions for a radiation image, wherein image processing conditions, under which an image signal representing a radiation image is to be image processed, are adjusted on the basis of the image signal, the apparatus for adjusting image processing conditions for a radiation image comprising:

i) an operation means for creating a probability density function of the image signal, detecting a predetermined characteristic value of the image signal from the probability density function, and calculating a value of a difference between the characteristic value and each of values of the image signal in the probability density function, the calculation being carried out for the whole image signal, ii) a neural network for receiving information representing the values of the differences, which have been calculated by the operation means for the whole image signal, and generating outputs, which represent temporary image processing conditions, in accordance with the values of the differences, and iii) a correction means for correcting the temporary image processing conditions, which have been obtained from the neural network, in accordance with a level of the characteristic value.

The present invention also provides a radiation image analyzing method, wherein a subdivision pattern of radiation images, the shape and location of an irradiation field, an orientation in which an object was placed when the image of the object was recorded, and/or a portion of an object the image of which was recorded is determined on the basis of an image signal representing a radiation image of the object, the radiation image analyzing method comprising the steps of:

i) creating a probability density function of the image signal, ii) detecting a predetermined characteristic value of the image signal from the probability density function, iii) calculating a value of a difference between the characteristic value and each of values of the image signal in the probability density function, the calculation being carried out for the whole image signal, iv) feeding information representing the values of the differences, which have been calculated for the whole image signal, into a neural network, which receives the information representing the values of the differences and generates outputs representing temporary results of the determination with respect to the radiation image, information representing the temporary results of the determination being thereby fed out from the neural network, and v) correcting the temporary results of the determination, which have been obtained from the neural network, in accordance with a level of the characteristic value, whereby final results of the determination are obtained.

The present invention further provides an apparatus for carrying out the radiation image analyzing method in accordance with the present invention.

Specifically, the present invention further provides a radiation image analyzing apparatus, wherein a subdivision pattern of radiation images, the shape and location of an irradiation field, an orientation in which an object was placed when the image of the object was recorded, and/or a portion of an object the image of which was recorded is determined on the basis of an image signal representing a radiation image of the object, the radiation image analyzing apparatus comprising:

i) an operation means for creating a probability density function of the image signal, detecting a predetermined characteristic value of the image signal from the probability density function, and calculating a value of a difference between the characteristic value and each of values of the image signal in the probability density function, the calculation being carried out for the whole image signal, ii) a neural network for receiving information representing the values of the differences, which have been calculated by the operation means for the whole image signal, and generating outputs, which represent temporary results of the determination with respect to the radiation image, in accordance with the values of the differences, and iii) a correction means for correcting the temporary results of the determination, which have been obtained from the neural network, in accordance with a level of the characteristic value.

With the method and apparatus for adjusting read-out conditions and/or image processing conditions for a radiation image in accordance with the present invention, the probability density function of the image signal is created, and the predetermined characteristic value in the probability density function is detected. The value of the difference between the characteristic value and each of values of the whole image signal in the probability density function is calculated. The information representing the values of the differences, which have been calculated for the whole image signal, is fed into the neural network, and the information representing the temporary read-out conditions and/or the temporary image processing conditions is thereby fed out from the neural network. The temporary read-out conditions and/or the temporary image processing conditions, which have been obtained from the neural network, are corrected in accordance with the level of the characteristic value. Specifically, it often occurs that a plurality of image signals representing the same portion of the object and having different gain components due to a difference in the level of overall density are fed into the neural network. In such cases, the neural network will process the plurality of the image signals as different signals. Therefore, the learning operation of the neural network will be carried out many times, and the efficiency, with which the read-out conditions for the final readout and/or the image processing conditions are adjusted, cannot be kept high. With the method and apparatus for adjusting read-out conditions and/or image processing conditions for a radiation image in accordance with the present invention, for the purposes of eliminating such problems, the gain components are eliminated from the plurality of the image signals, which include different gain components, by utilizing the characteristic values of the image signals as a reference such that the image signals may become those of approximately the same gain level. Therefore, by using the neural network capable of making a judgment in broad aspects, drawbacks of a method utilizing only the probability density function of an image signal can be eliminated (i.e. errors due to local analysis can be eliminated). Also, the read-out conditions for the final readout and/or the image processing conditions can be adjusted efficiently and accurately, the learning of the neural network being repeated only a few times.

With the radiation image analyzing method and apparatus in accordance with the present invention, the probability density function of the image signal is created, and the predetermined characteristic value in the probability density function is detected. The value of the difference between the characteristic value and each of values of the whole image signal in the probability density function is calculated. The information representing the values of the differences, which have been calculated for the whole image signal, is fed into the neural network. From the neural network, characteristic measures are obtained which represent temporary results of the determination with respect to a subdivision pattern of radiation images, the shape and location of an irradiation field, an orientation in which an object was placed when the image of the object was recorded, and/or a portion of an object the image of which was recorded. The characteristic measures are then corrected in accordance with the level of the characteristic value. Therefore, as in the method and apparatus for adjusting read-out conditions and/or image processing conditions for a radiation image in accordance with the present invention, by using the neural network capable of making a judgment in broad aspects, drawbacks of a method utilizing only the probability density function of an image signal can be eliminated (i.e. errors due to local analysis can be eliminated). Also, the results of the determination can be analyzed efficiently and accurately, the learning of the neural network being repeated only a few times.

DESCRIPTION OF THE PREFERRED EMBODIMENTS

The present invention will hereinbelow be described in further detail with reference to the accompanying drawings.

Figure 1:
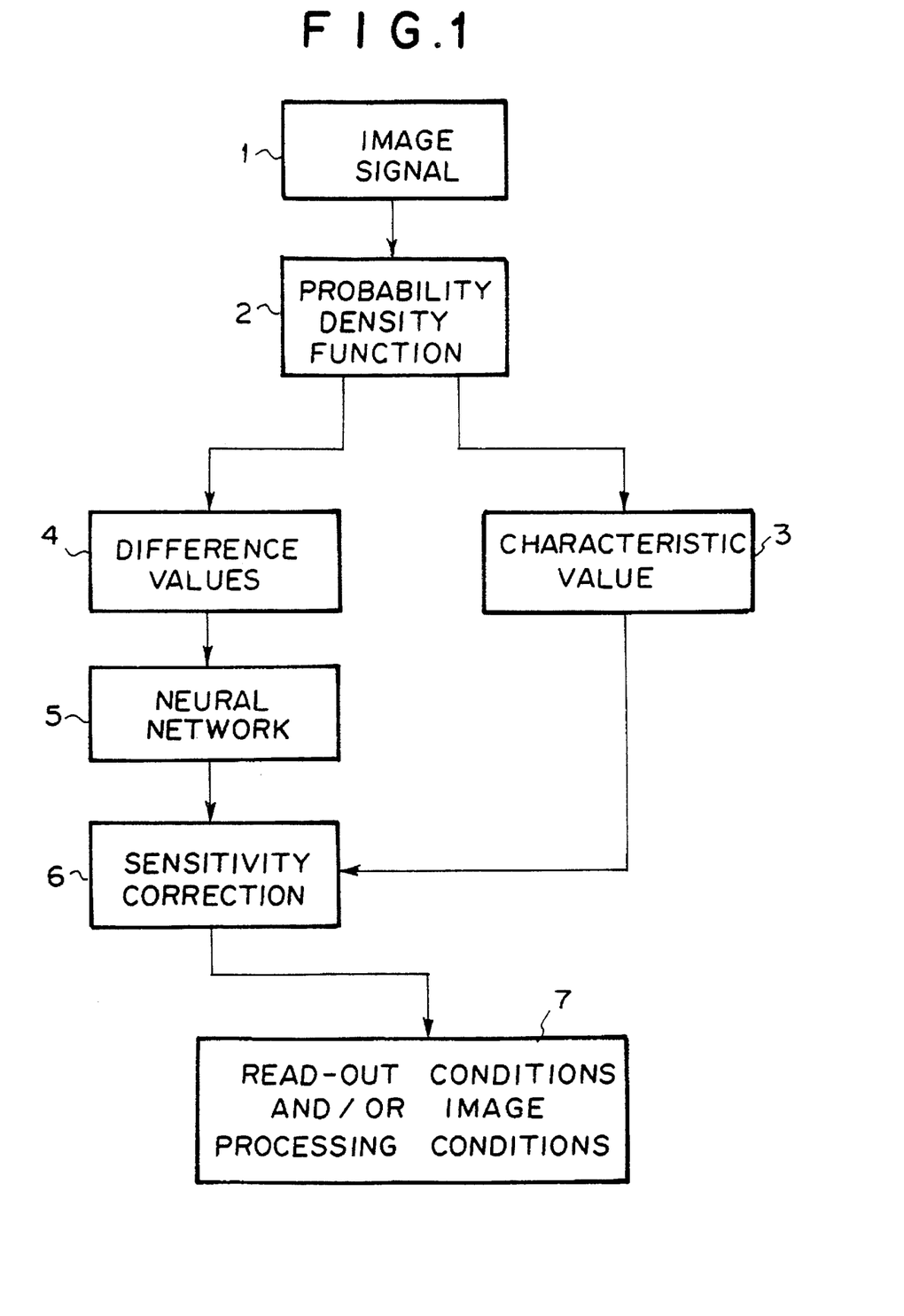
FIG. 1 is a block diagram showing a basic concept behind an embodiment of the method for adjusting read-out conditions and/or image processing conditions for a radiation image in accordance with the present invention.

FIG. 1 is a block diagram showing a basic concept behind an embodiment of the method for adjusting read-out conditions and/or image processing conditions for a radiation image in accordance with the present invention. Specifically, with this embodiment, a probability density function 2 of an image signal 1 representing a radiation image is created. A characteristic value 3 of the image signal 1 is detected from the probability density function 2. Thereafter, a calculation is made to find a value of difference 4 between the characteristic value 3 and each of the values of the image signal 1 in the probability density function 2. Such calculations are made for the whole image signal 1, and values of differences 4 are thereby obtained. Information representing the values of differences 4 is fed into a neural network 5, and outputs representing temporary read-out conditions for the final readout and/or temporary image processing conditions are obtained from the neural network 5. Sensitivity correction 6 is carried out on the temporary read-out conditions for the final readout and/or the temporary image processing conditions, and final read-out conditions for the final readout and/or final image processing conditions 7 are thereby obtained.

Figure 2:
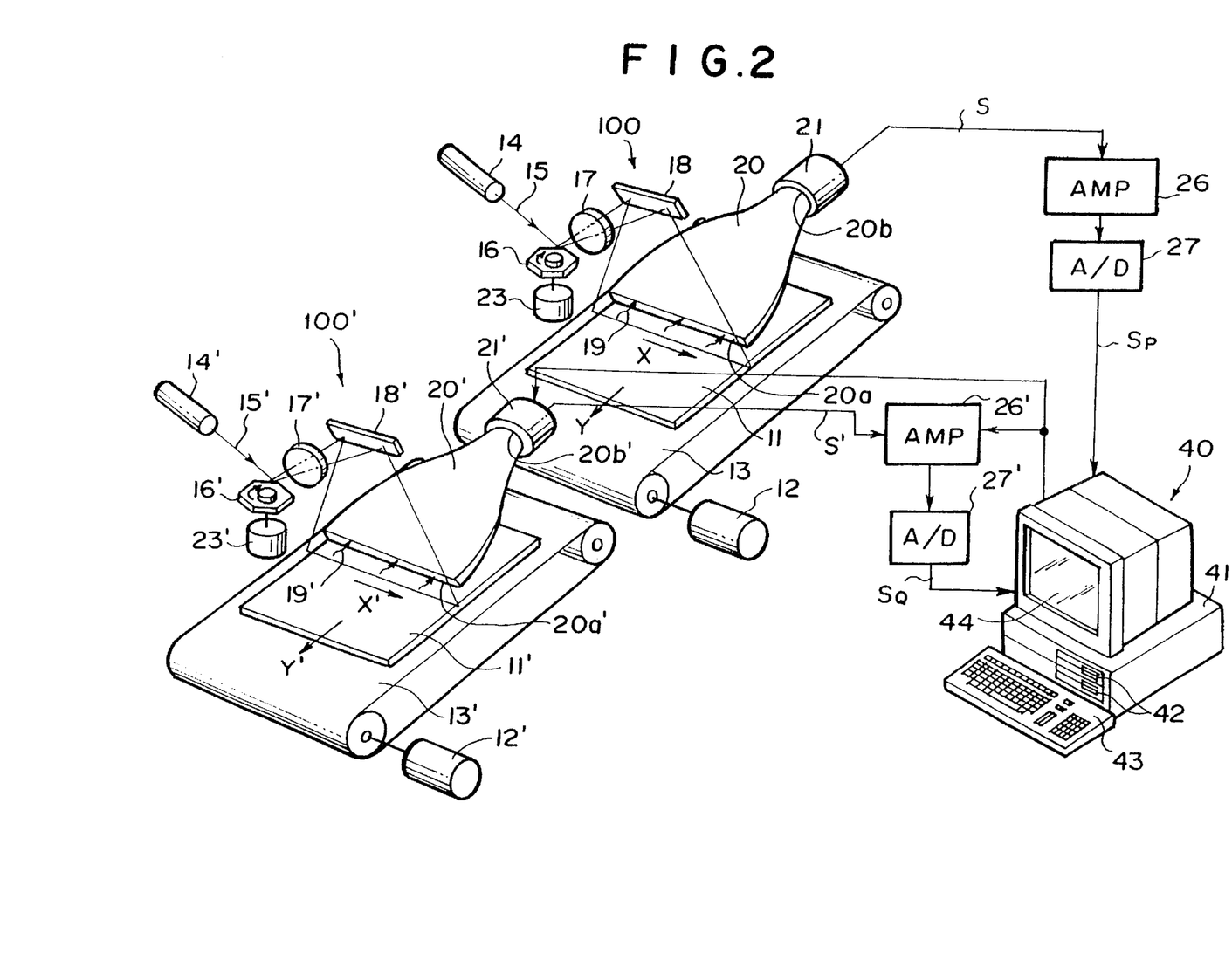
FIG. 2 is a perspective view showing an example of an X-ray image read-out apparatus provided with a computer system for carrying out the embodiment of the method for adjusting read-out conditions and/or image processing conditions for a radiation image in accordance with the present invention.

FIG. 2 is a perspective view showing an example of an X-ray image read-out apparatus, which is employed in the embodiment of the method for adjusting read-out conditions and/or image processing conditions for a radiation image in accordance with the present invention, and an example of a computer system, in which an apparatus for adjusting read-out conditions and/or image processing conditions for a radiation image in accordance with the present invention is employed. In this embodiment, by way of example, a stimulable phosphor sheet is used, and a preliminary readout is carried out. Also, in this embodiment, a maximum signal value Smax1 of the image signal representing a region of the stimulable phosphor sheet other than a background region is detected from the probability density function and employed as the characteristic value.

In an X-ray image recording apparatus (not shown), an X-ray image of an object has been stored on a stimulable phosphor sheet 11. The stimulable phosphor sheet 11, on which the X-ray image has been stored, is placed at a predetermined position in a preliminary read-out means 100, which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13, which is constituted of an endless belt, or the like, and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17, which may be constituted of an fθ lens, or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material, such as an acrylic plate, and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP, which has been obtained in the manner described above, is fed into a computer system 40. The computer system 40 is provided with an example of the apparatus for adjusting read-out conditions and/or image processing conditions for a radiation image in accordance with the present invention. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In the computer system 40, when necessary, a subdivision pattern and the shape and location of an irradiation field are determined from the preliminary read-out image signal SP. Thereafter, the probability density function of the preliminary read-out image signal SP is created and analyzed. The read-out conditions for the final readout, i.e. the sensitivity Sk and the latitude Gp during the final readout, are determined by the neural network on the basis of the results of the analysis of the probability density function. By way of example, the voltage applied to a photomultiplier 21' and the amplification factor of a logarithmic amplifier 26' are controlled in accordance with the sensitivity Sk and the latitude Gp.

The latitude Gp corresponds to the ratio of the largest amount of emitted light, which is capable of being accurately converted into an image signal during the final readout, to the smallest amount of emitted light, which is capable of being accurately converted into an image signal during the final readout. The sensitivity Sk corresponds to the photoelectric conversion factor, which represents to what image signal level a predetermined amount of emitted light is to be converted.

A stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal is detected under the read-out conditions which have been determined on the basis of the preliminary read-out image signal SP. The configuration of the final read-out means 100' is nearly the same as that of the preliminary read-out means 100, and therefore elements corresponding to those constituting the preliminary read-out means 100 are numbered with corresponding primed reference numerals in FIG. 2.

After the image signal is digitized in an A/D converter 27', the resulting image signal SQ is fed into the computer system 40. The computer system 40 carries out appropriate image processing on the image signal SQ. After being image processed, the image signal is fed into a reproducing apparatus (not shown), which reproduces a visible image from the image signal.

In the computer system 40, the probability density function of the preliminary read-out image signal SP is created, and the characteristic value of the probability density function is detected. The values of the differences between the characteristic value and the values of the preliminary read-out image signal SP are then calculated. Thereafter, the read-out conditions for the final readout and/or the image processing conditions, under which an image signal obtained from an image read-out operation is to be image processed, are adjusted by the neural network.

The preliminary read-out image signal SP is fed into an operating section of the computer system 40. The operating section carries out the embodiment of the method for adjusting read-out conditions and/or image processing conditions for a radiation image in accordance with the present invention. In this embodiment, the combination of the hardware function and the software function corresponding to each means of the apparatus for adjusting read-out conditions and/or image processing conditions for a radiation image in accordance with the present invention constitutes each said means.

Figure 3:
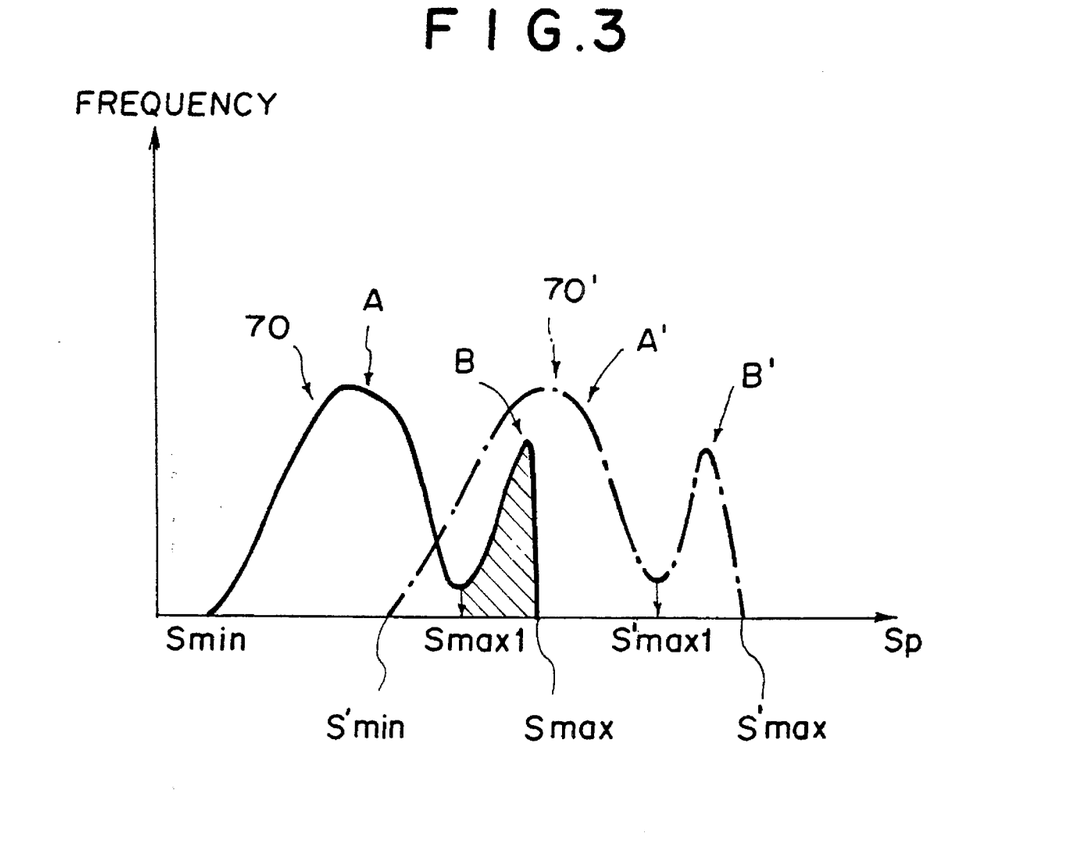
FIG. 3 is a graph showing an example of a probability density function of a preliminary read-out image signal, which has been detected from a stimulable phosphor sheet.

FIG. 3 is a graph showing the probability density function of the preliminary read-out image signal SP. In FIG. 3, the horizontal axis represents the values of the preliminary read-out image signal SP, and the vertical axis represents the frequency of occurrence of each of the values of the preliminary read-out image signal SP (each image signal component corresponding to one picture element in the X-ray image is counted as one).

With reference to FIG. 3, a probability density function 70 is composed of a projecting part A, which corresponds to the object image, and a projecting part B, which corresponds to the background region and is formed on the side of larger values of the preliminary read-out image signal SP than the projecting part A. Specifically, the projecting part B represents the background region, upon which the X-rays direct impinged without passing through the object. The value of the preliminary read-out image signal SP representing the maximum amount of light emitted by the region outside of the background region, i.e. the image signal value Smaxl, is detected as the characteristic value. After the image signal value Smaxl has been detected, a calculation is made to find the value of the difference between the image signal value Smaxl and each of the values of the preliminary read-out image signal SP in the probability density function 70. Such a calculation is carried out for the whole preliminary read-out image signal SP. Thereafter, information representing the values of the differences, which have thus been obtained for the whole preliminary read-out image signal SP, is fed into the neural network, and outputs representing the sensitivity Sk and the latitude Gp are obtained from the neural network.

As illustrated in FIG. 3, a probability density function 70' may be obtained which represents the same image structure as the probability density function 70 and which varies in gain level from the probability density function 70 due to a difference in image density. In such cases, if the information representing the probability density function 70' is directly fed into a neural network, the neural network will process the probability density function 70 and the probability density function 70' as different ones. Therefore, large numbers of learning operations of the neural network must be carried out, and the efficiency, with which the read-out conditions for the final readout and/or the image processing conditions are adjusted, cannot be kept high. With the method for adjusting read-out conditions and/or image processing conditions for a radiation image in accordance with the present invention, for the purposes of eliminating such problems, the aforesaid values of the differences are calculated from the probability density function 70 and the probability density function 70'. The values of the differences thus calculated become identical for the two probability density functions. The information representing the values of the differences, which have been calculated from the probability density function 70, and the information representing the values of the differences, which have been calculated from the probability density function 70', are fed into the neural network. Therefore, the neural network can recognize the probability density functions 70 and 70' as those of the same types of images. The learning operation of the neural network can thus be carried out efficiently, and the efficiency, with which the read-out conditions for the final readout and/or the image processing conditions are adjusted, can be kept high.

How the learning operation of the neural network is repeated and correct read-out conditions for the final readout are obtained from the neural network will be described hereinbelow.

Figure 4:
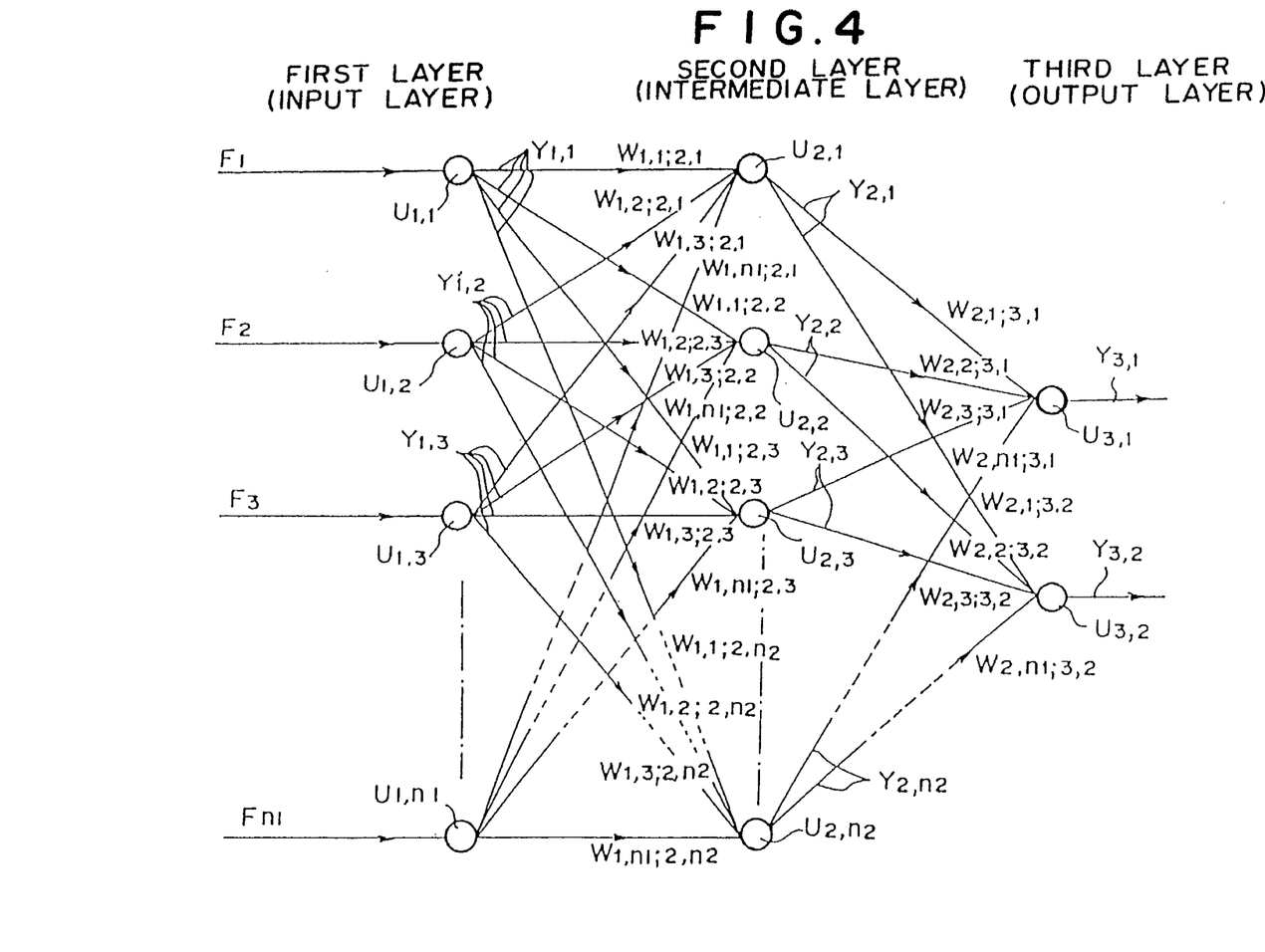
FIG. 4 is an explanatory view showing an example of a neural network which is employed in the embodiment of the method for adjusting read-out conditions and/or image processing conditions for a radiation image in accordance with the present invention.

FIG. 4 is an explanatory view showing an example of the neural network which is provided with a learning function by back propagation method. As described above, the term "learning function by back propagation method" as used herein means the learning algorithms in a neural network, with which the output of the neural network is compared with a correct answer (an instructor signal), and the weights of connections (i.e. the weights of synapse connections) are corrected sequentially from the output side to the input side of the neural network.

With reference to FIG. 4, the neural network comprises a first layer (an input layer), a second layer (an intermediate layer), and a third layer (an output layer). The first, second, and third layers are composed respectively of n1 number of units (neurons), n2 number of units (neurons), and two units (neurons). Signals F1, F2, . . . , Fn1 fed into the first layer (the input layer) represent the values of the differences between the image signal value Smax1 and the values of the image signal components of the preliminary read-out image signal. The values of the differences have been calculated for the whole preliminary read-out image signal on the basis of the image signal components of the preliminary read-out image signal representing the picture elements in the X-ray image. Two outputs $y_1^3$ and $y_2^3$ obtained from the third layer (the output layer) are the signals corresponding to the sensitivity and the latitude during the final readout. An i'th unit of a k'th layer is indicated by $u_i^k$. The total input into the unit $u_i^k$ is indicated by $x_i^k$, and the total output therefrom is indicated by $y_i^k$. The weight of connection from the unit $u_i^k$ to a unit $u_j^{k+1}$ indicated by $W_{ij}^{k\,k+1}$. Also, each unit $u_j^k$ has the same characteristic function, which is expressed as $$f(x) = \frac{1}{1-e^x} \qquad (1)$$

The input $x_j^k$ into each unit $u_j^k$ and the output $y_j^k$ therefrom are expressed as $$x_j^k = \Sigma_i W_{ij}^{k-1\,k} \cdot y_i^{k-1} \qquad (2)$$

$$y_j^k = f(x_j^k) \qquad (3)$$

Inputs F1, F2, . . . , Fn1 into the units $u_i^1$, where i=1, 2, . . . , n1, which units constitute the input layer, are fed into the units $u_i^1$, where i=1, 2, . . . , n1, without being weighted. The n1 number of signals F1, F2, . . . , Fn1 are weighted with the weights of connections $W_{ij}^{k\,k+1}$, and transmitted to the ultimate outputs $y_1^3$ and $y_2^3$. In this manner, the read-out conditions for the final readout (i.e. the sensitivity and the latitude) are obtained.

How the weights of connections $W_{ij}^{k\,k+1}$ are determined will be described hereinbelow. First, initial values of the weights of connections $W_{ij}^{k\,k+1}$ are given by random numbers. The range of the random numbers should preferably be limited such that, even when the values of the inputs F1, F2, . . . , Fn1 fluctuate to the largest extent, the outputs $y_1^3$ and $y_2^3$ may take values falling within a predetermined range or values close to said predetermined range.

Thereafter, preliminary read-out image signals are obtained in the manner described above from a plurality of stimulable phosphor sheets storing X-ray images, for which the appropriate read-out conditions for the final readout are known. The preliminary read-out image signals are then thinned out. In this manner, the n1 number of inputs F1, F2, . . . , Fn1 are obtained. The n1 number of inputs F1, F2, . . . , Fn1 are fed into the neural network shown in FIG. 4, and the outputs $y_i^k$ of the respective units $u_i^k$ are monitored.

After the outputs $y_i^k$ are obtained, square errors E1 and E2 between the ultimate outputs $y_1^3$, $y_2^3$ and the instructor signals (the sensitivity $y_1^3$ and the latitude $y_2^3$) representing the read-out conditions for the final readout appropriate for the image are calculated with the formulas $$E_1 = \frac{1}{2}(y_1^3 - \tilde{y}_1^3)^2 \qquad (4)$$

$$E_2 = \frac{1}{2}(y_2^3 - \tilde{y}_2^3)^2 \qquad (5)$$

The weights of connections $W_{ij}^{k\,k+1}$ are then corrected such that the square errors E1 and E2 become smallest. The output $y_{13}$ will be described hereinbelow. The descriptions below also apply to the output $y_2^3$.

The square error E1 is a function of $W_{ij}^{k\,k+1}$. Therefore, in order for the square error E1 to be minimized, the weights of connections $W_{ij}^{k\,k+1}$ are corrected with the formula $$W_{ij}^{kk+1} = W_{ij}^{kk+1} - \eta \cdot \frac{\partial E_1}{\partial W_{ij}^{kk+1}} \qquad (6)$$

where $\eta$ denotes a coefficient, which is referred to as a learning coefficient.

The following formula obtains:

$$\frac{\partial E_1}{\partial W_{ij}^{kk+1}} = \frac{\partial E_1}{\partial x_j^{k+1}} \cdot \frac{\partial x_j^{k+1}}{\partial W_{ij}^{kk+1}} \qquad (7)$$

Also, Formula (2) gives $$x_j^{k+1} = \Sigma_j W_{ij}^{kk+1} \cdot y_i^k \qquad (8)$$

Therefore, Formula (7) gives $$\frac{\partial E_1}{\partial W_{ij}^{kk+1}} = \frac{\partial E_1}{\partial x_j^{k+1}} \cdot y_i^k \qquad (9)$$

From Formula (4), the following formula obtains:

$$\frac{\partial E_1}{\partial x_1^3} = (y_1^3 - \tilde{y}_1^3) \cdot \frac{\partial y_1^3}{\partial x_1^3} \qquad (10)$$

Formula (10) can be changed with Formula (3) into $$\frac{\partial E_1}{\partial x_1^3} = (y_1^3 - \tilde{y}_1^3) \cdot f'(x_1^3) \qquad (11)$$

From Formula (1), the following formula obtains:

$$f'(x) = f(x)(1 - f(x)) \qquad (12)$$

Therefore, $$f'(x_1^3) = Y_1^3 \cdot (1 - y_1^3) \qquad (13)$$

Setting K=2 in Formula (9) and substituting Formulas (11) and (13) into Formula (9) yield $$\frac{\partial E_1}{\partial W_{ii}^{23}} = \frac{\partial E_1}{\partial x_1^3} \cdot y_i^2 = (y_1^3 - \tilde{y}_1^3) \cdot y_1^3 \cdot y_1^3 \cdot (1 - y_1^3) \cdot y_i^2 \qquad (14)$$

Substitution of Formula (14) into Formula (6) yields $$W_{i1}^{23} = W_{i1}^{23} - \eta \cdot (y_1^3 - \tilde{y}_1^3) \cdot y_1^3 \cdot (1 - y_1^3) \cdot y_i^2 \qquad (15)$$

The weights of connections $W_{i\,1}^{2\,3}$, where i=1, 2, . . . , n1, are corrected with Formula (15).

Also, the following formula obtains:

$$\frac{\partial E_1}{\partial x_j^2} = \frac{\partial E_1}{\partial x_1^3} \cdot \frac{\partial x_1^3}{\partial x_j^2} \qquad (16)$$

Substitution of Formulas (2) and (3) into Formula (16) yields $$\frac{\partial E_1}{\partial x_j^2} = \frac{\partial E_1}{\partial x_1^3} \cdot \frac{\partial}{\partial x_j^2} \left( \sum_j W_{ij}^{23} \cdot y_j^2 \right) = \frac{\partial E_1}{\partial x_1^3} \cdot W_{jl}^{23} \cdot f'(x_j^2) \quad (17)$$

Formula (12) gives $$f'(x_j^2) = y_j^2 \cdot (1 - y_j^2) \quad (18)$$

Substitution of Formulas (11), (13), and (18) into Formula (17) yields $$\frac{\partial E_1}{\partial x_j^2} = (y_1^3 - \tilde{y}_1^3) \cdot y_1^3 (1 - y_1^3) \cdot y_j^2 \cdot (1 - y_j^2) \cdot W_{jl}^{23} \quad (19)$$

Setting k=1 in Formula (9) and substituting Formula (19) into Formula (9) yield $$\frac{\partial E_1}{\partial W_{ij}^{12}} = \frac{\partial E_1}{\partial x_j^2} \cdot y_i^1 = (y_1^3 - \tilde{y}_1^3) \cdot \quad (20)$$

$$y_1^3 (1 - y_1^3) \cdot y_j^2 \cdot (1 - y_j^2) \cdot W_{jl}^{23} \cdot y_i^1$$

Substitution of Formula (20) into Formula (6) and setting of k=1 yield $$W_{ij}^{12} = W_{ij}^{12} - \eta \cdot (y_I^3 - \tilde{y}_I^3) \cdot y_I^3 \cdot \quad (21)$$

$$(1 - y_I^3) \cdot y_j^2 \cdot (1 - y_j^2) \cdot y_i^1 \cdot W_{jl}^{23}$$

The values of the weights of connections $W_{i\ 1}^{2\ 3}$, where i=1, 2, ..., n1, which have been corrected with Formula (15), are substituted into Formula (12). In this manner, the weights of connections $W_{i\ j}^{1\ 2}$, where i=1, 2, ..., n1 and j=1, 2, ..., n2, are corrected.

Theoretically, the weights of connections $W_{i\ j}^{k\ k+1}$ can be converged to predetermined values by using Formulas (15) and (21), using a sufficiently small value of the learning coefficient η and carrying out the learning operations very many times. However, if a sufficiently small value of the learning coefficient η is used, the speed with which the learning operations are effected will become low. If a very large value of the learning coefficient η is used, "vibration" will occur in the learning operations (i.e. the weights of connections do not converge to predetermined values). Therefore, actually, the vibration is prevented by employing an inertia term, which is expressed in Formula (22), in the calculations of the correction amounts for the weights of connections, and the learning coefficient η is set at a slightly large value.

$$\Delta W_{ij}^{kk+1}(t+1) = \alpha \cdot \Delta W_{ij}^{kk+1}(t) + \eta \cdot \frac{\partial E_1}{\partial x_j^{k+1}} \cdot y_i^k \quad (22)$$

where α denotes the coefficient referred to as the inertia term, and $\Delta W_{i\ j}^{k\ k+1}(t)$ denotes the correction amount, which is used during the t'th learning operation and which is obtained by subtracting a weight of connection $W_{i\ j}^{k\ k+1}$, which has not been corrected, from a weight of connection $W_{i\ j}^{k\ k+1}$, which has been corrected. (Such an inertia term is described in, for example, "Learning internal representations by error propagation In Parallel Distributed Processing" by D. E. Rumelhart, G. E. Hinton and R. J. Williams, Volume 1, J. L. McClell and, D. E. Rumelhart and The PDP Research Group, MIT Press, 1986b.)

By way of example, the inertia term α is set at 0.9, the learning coefficient η is set at 0.25, and 200,000 times of corrections (learning operations) are carried out for each of the weights of connections $W_{i\ j}^{k\ k+1}$. Thereafter, each of the weights of connections $W_{i\ j}^{k\ k+1}$ is fixed at a final value, At the time at which the learning operations are completed, the two outputs $Y_1^3$ and $Y_2^3$ represents the appropriate sensitivity and the appropriate latitude during the final readout.

Therefore, after the learning operations are completed, in order for appropriate read-out conditions for the final read-out to be obtained for an X-ray image, a preliminary read-out image signal is detected from the X-ray image. Calculations are then made to find the values of the differences between the image signal value Smaxl and the values of the preliminary read-out image signal in the probability density function of the preliminary read-out image signal. The information representing the values of the differences thus calculated is fed into the neural network shown in FIG. 4. The outputs $Y_1^3$ and $Y_2^3$ obtained from the neural network are utilized as signals representing the read-out conditions (i.e. the sensitivity and the latitude) for the final readout appropriate for the X-ray image. Because the learning operations have been carried out in the manner described above, the signals accurately represent the appropriate read-out conditions for the final readout.

The number of layers of the neural network is not limited to three. Also, no limitation is imposed on the number of the units of each layer. The number of the units of each layer may be determined in accordance with the number of the picture elements represented by the preliminary read-out image signal SP, which is fed into the neural network, the accuracy, with which the read-out conditions for the final readout are to be obtained, or the like.

How the sensitivity is corrected in the embodiment of the method for adjusting read-out conditions and/or image processing conditions for a radiation image in accordance with the present invention will be described hereinbelow. In the embodiment, the gain components are removed from the image signal. The resulting signal is fed into the neural network, and outputs representing the read-out conditions for the final readout are obtained from the neural network. Therefore, the read-out conditions for the final readout (i.e., the sensitivity Sk' and the latitude Gp') are the temporary read-out conditions for the final readout, which do not correspond to the gain level of the image signal. As described above, the latitude corresponds to the ratio of the largest amount of emitted light, which is capable of being accurately converted into an image signal during the final readout, to the smallest amount of emitted light, which is capable of being accurately converted into an image signal during the final readout. Specifically, the latitude corresponds to the ratio of the maximum value to the minimum value of the difference values, the information about which is fed into the neural network. The information, which represents the ratio of the maximum value to the minimum value of the difference values, is fed as the latitude out of the neural network. Therefore, no correction need be carried out for the latitude. On the other hand, the sensitivity Sk' is calculated in terms of the values of the differences between the image signal value Smaxl and the values of the preliminary read-out image signal SP.

Therefore, the sensitivity Sk' is corrected with the formula

Sensitivity Sk=Smaxl/64−Sk' \quad (23)

In Formula (23), the image signal value Smaxl is divided by 64. This is due to a difference between the units of the image signal value Smaxl and the units of the sensitivities Sk and Sk'. Specifically, the units of the image signal value Smaxl are the quantum level (the horizontal axis of the probability density function), and the units of the sensitivities Sk and Sk' are the number of the orders of ten of the amount of the X-rays impinging upon the stimulable phosphor sheet. In this embodiment, the number of the orders of ten of the amount of the X-rays increases by one per 64 quantum level (for example, 1 mR for 128 quantum level, 10 mR for 192 quantum level, and 100 mR for 256 quantum level). Therefore, for the purposes of correcting the units of the image signal value Smax1 and the sensitivities Sk and Sk', the image signal value Smax1 is divided by 64.

The sensitivity is corrected in the manner described above, and the read-out conditions for the final readout (i.e., the sensitivity and the latitude) are adjusted.

The voltage applied to the photomultiplier 21' of the final read-out means 100', the amplification factor of the logarithmic amplifier 26' and the like, are controlled in accordance with the read-out conditions for the final readout, which have been adjusted by the neural network and the sensitivity correction means. The final readout is carried out under the controlled conditions.

An embodiment of the radiation image analyzing method in accordance with the present invention will be described hereinbelow.

In the embodiment of the radiation image analyzing method in accordance with the present invention, a subdivision pattern of radiation images, the shape and location of an irradiation field, an orientation in which an object was placed when the image of the object was recorded, and/or a portion of an object the image of which was recorded is determined by the neural network, which is employed in the aforesaid embodiment of the method for adjusting read-out conditions and/or image processing conditions for a radiation image in accordance with the present invention. Outputs representing the characteristic measures, which are the results of the determination, are obtained from the neural network.

Specifically, in the embodiment of the radiation image analyzing method in accordance with the present invention, the preliminary read-out image signal SP is obtained from the X-ray image read-out apparatus, which is shown in FIG. 2 and is employed in the aforesaid embodiment of the method for adjusting read-out conditions and/or image processing conditions for a radiation image in accordance with the present invention. Also, in the computer system 40, the probability density function of the preliminary read-out image signal SP is created, and the characteristic value of the probability density function is detected. A calculation is then made to find the value of the difference between the characteristic value and each of the values of the preliminary read-out image signal SP. Such a calculation is made for the whole preliminary read-out image signal SP. Information representing the values of the differences, which have been calculated for the whole preliminary read-out image signal SP, is fed into the neural network. Thereafter, a subdivision pattern of radiation images, the shape and location of an irradiation field, an orientation in which an object was placed when the image of the object was recorded, and/or a portion of an object the image of which was recorded is determined by the neural network. Outputs representing the characteristic measures, which are the results of the determination, are obtained from the neural network.

The X-ray image read-out apparatus, in which the embodiment of the radiation image analyzing method in accordance with the present invention is employed, is the same as the X-ray image read-out apparatus, which is employed in the aforesaid embodiment of the method for adjusting read-out conditions and/or image processing conditions for a radiation image in accordance with the present invention.

The embodiment of the radiation image analyzing method in accordance with the present invention is different from the aforesaid embodiment of the method for adjusting read-out conditions and/or image processing conditions for a radiation image in accordance with the present invention in that the outputs representing the subdivision pattern and the orientation in which the object was placed when the image of the object was recorded are obtained from the neural network. On the basis of the preliminary read-out image signal SP, the neural network generates the outputs accurately representing the characteristic measures concerning the subdivision pattern and the orientation in which the object was placed when the image of the object was recorded. Thereafter, the read-out conditions for the final readout are adjusted in accordance with the orientation, in which the object was placed when the image of the object was recorded, and on the basis of only the preliminary read-out image signal SP corresponding to the region inside of the subdivision pattern. The voltage applied to the photomultiplier 21' of the final read-out means 100', the amplification factor of the logarithmic amplifier 26', and the like, are controlled in accordance with the read-out conditions for the final readout, which have thus been adjusted by the neural network. The final readout is carried out under the controlled conditions.

In the aforesaid embodiment of the radiation image analyzing method in accordance with the present invention, the subdivision pattern and the orientation, in which the object was placed when the image of the object was recorded, are determined by the neural network. The shape and location of the irradiation field and the portion of the object the image of which was recorded can also be determined in the same manner as that described above by the neural network. In such cases, as the two outputs, the signals representing the shape and location of the irradiation field and the portion of the object, the image of which was recorded, are generated. In cases where the signal representing the irradiation field represents, for example, only whether the irradiation field is circular or rectangular, one of the two outputs may represent 1 (for the circular irradiation field) or 0 (for the rectangular irradiation field). In such cases, the determination can be carried out very easily by the neural network.

Also, for the portion of the object the image of which was recorded, several portions of the object may be represented by numerals. In this manner, the determination can be carried out very easily by the neural network.

The characteristic measures representing the shape and location of the irradiation field and the portion of the object, the image of which was recorded, are obtained in the manner described above. Thereafter, the read-out conditions for the final readout are adjusted in accordance with the portion of the object, the image of which was recorded, and on the basis of only the preliminary read-out image signal SP corresponding to the region inside of the irradiation field. The final readout is carried out under the read-out conditions which have thus been adjusted.

In the aforesaid embodiments of the method for adjusting read-out conditions and/or image processing conditions for a radiation image and the radiation image analyzing method in accordance with the present invention, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

In the aforesaid embodiment of the method for adjusting read-out conditions and/or image processing conditions for a radiation image in accordance with the present invention, the read-out conditions for the final readout are adjusted by the computer system 40. Alternatively, predetermined read-out conditions may be used when the final readout is carried out regardless of the characteristics of the preliminary read-out image signal SP. On the basis of the preliminary read-out image signal SP, the computer system 40 may adjust the image processing conditions to be used in carrying out image processing of the image signal SQ. The computer system 40 may also adjust both the read-out conditions and the image processing conditions.

The aforesaid embodiment of the method for adjusting read-out conditions and/or image processing conditions for a radiation image in accordance with the present invention is applied to the radiation image read-out apparatus wherein the preliminary readout is carried out. However, the method for adjusting read-out conditions and/or image processing conditions for a radiation image in accordance with the present invention is also applicable to radiation image read-out apparatuses wherein no preliminary read-out operations are carried out, and only the aforesaid final read-out operations are carried out. In these cases, an image signal is obtained by use of predetermined read-out conditions. Based on the image signal, image processing conditions are calculated by the computer system 40. The image signal is processed under the calculated image processing conditions.

The aforesaid embodiment of the radiation image analyzing method in accordance with the present invention is applied to the radiation image read-out apparatus wherein the preliminary readout is carried out. However, the radiation image analyzing method in accordance with the present invention is also applicable to radiation image read-out apparatuses wherein no preliminary read-out operations are carried out, and only the aforesaid final read-out operations are carried out. In these cases, an image signal is obtained by use of predetermined read-out conditions. In the computer system 40, the characteristic measures representing the shape and location of the irradiation field, the portion of the object, the image of which was recorded, and the like, are obtained on the basis of the image signal, which has thus been detected. The image processing conditions are adjusted in accordance with the portion of the object, the image of which was recorded, and the like, and on the basis of only the image signal corresponding to the region inside of the irradiation field. The image signal is then processed under the adjusted image processing conditions.

Also, in the aforesaid embodiments of the method for adjusting read-out conditions and/or image processing conditions for a radiation image and the radiation image analyzing method in accordance with the present invention, the maximum signal value Smaxl of the image signal representing the region of the stimulable phosphor sheet other than the background region is employed as the characteristic value of the probability density function. Alternatively, any of other values may be employed as the characteristic value of the probability density function. For example, as shown in FIG. 3, the mean value of the maximum value Smax and the minimum value Smin of the probability density function, the mean value of the image signal value Smaxl and the minimum value Smin, or the like, may be employed as the characteristic value.

Additionally, in the aforesaid embodiments of the method for adjusting read-out conditions and/or image processing conditions for a radiation image and the radiation image analyzing method in accordance with the present invention, the stimulable phosphor sheet is employed. The method for adjusting read-out conditions and/or image processing conditions for a radiation image and the radiation image analyzing method in accordance with the present invention are also applicable when conventional X-ray film is used.

What is claimed is:

1. A method for adjusting read-out conditions and/or image processing conditions for a radiation image, wherein a first image signal representing a radiation image is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the method for adjusting read-out conditions and/or image processing conditions for said radiation image comprising the steps of:

i) creating a probability density function of the first image signal, ii) detecting a predetermined characteristic value of the first image signal from said probability density function, iii) calculating a value of a difference between said characteristic value and each of values of the first image signal in said probability density function, said calculation being carried out for the whole first image signal, iv) feeding information representing the values of the differences, which have been calculated for the whole first image signal, into a neural network, which receives said information representing said values of said differences and generates outputs representing temporary read-out conditions and/or temporary image processing conditions, information representing said temporary read-out conditions and/or said temporary image processing conditions being thereby fed out from said neural network, and v) correcting said temporary read-out conditions and/or said temporary image processing conditions, which have been obtained from said neural network, in accordance with a level of said characteristic value, whereby the read-out conditions, under which the second image signal is to be obtained, and/or the image processing conditions, under which the second image signal having been obtained is to be image processed, are adjusted.

2. A method for adjusting read-out conditions and/or image processing conditions for a radiation image as defined in claim 1 wherein said characteristic value is selected from the group consisting of a maximum value of the first image signal in said probability density function, a minimum value of the first image signal in said probability density function, a maximum value of the first image signal in said probability density function, which value represents a maximum amount of light emitted by a region other than a background region on the stimulable phosphor sheet, or a mean value of maximum and minimum values of the first image signal.

3. An apparatus for adjusting read-out conditions and/or image processing conditions for a radiation image, wherein a first image signal representing a radiation image is obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, a second image signal representing the radiation image is thereafter obtained by again exposing the stimulable phosphor sheet to stimulating rays, the light emitted by the stimulable phosphor sheet being detected, and read-out conditions, under which the second image signal is to be obtained, and/or image processing conditions, under which the second image signal having been obtained is to be image processed, are adjusted on the basis of the first image signal, the apparatus for adjusting read-out conditions and/or image processing conditions for said radiation image comprising:
  i) an operation means for creating a probability density function of the first image signal, detecting a predetermined characteristic value of the first image signal from said probability density function, and calculating a value of a difference between said characteristic value and each of values of the first image signal in said probability density function, said calculation being carried out for the whole first image signal,
  ii) a neural network for receiving information representing the values of the differences, which have been calculated by said operation means for the whole first image signal, and generating outputs, which represent temporary read-out conditions and/or temporary image processing conditions, in accordance with said values of said differences, and
  iii) a correction means for correcting said temporary read-out conditions and/or said temporary image processing conditions, which have been obtained from said neural network, in accordance with a level of said characteristic value.

4. An apparatus for adjusting read-out conditions and/or image processing conditions for a radiation image as defined in claim 3 wherein said characteristic value is selected from the group consisting of a maximum value of the first image signal in said probability density function, a minimum value of the first image signal in said probability density function, a maximum value of the first image signal in said probability density function, which value represents a maximum amount of light emitted by a region other than a background region on the stimulable phosphor sheet, or a mean value of maximum and minimum values of the first image signal.

5. A method for adjusting image processing conditions for a radiation image, wherein image processing conditions, under which an image signal representing a radiation image is to be image processed, are adjusted on the basis of the image signal, the method for adjusting image processing conditions for said radiation image comprising the steps of:
  i) creating a probability density function of the image signal,
  ii) detecting a predetermined characteristic value of the image signal from said probability density function,
  iii) calculating a value of a difference between said characteristic value and each of values of the image signal in said probability density function, said calculation being carried out for the whole image signal,
  iv) feeding information representing the values of the differences, which have been calculated for the whole image signal, into a neural network, which receives said information representing said values of said differences and generates outputs representing temporary image processing conditions, information representing said temporary image processing conditions being thereby fed out from said neural network, and
  v) correcting said temporary image processing conditions, which have been obtained from said neural network, in accordance with a level of said characteristic value, whereby the image processing conditions, under which the image signal is to be image processed, are adjusted.

6. A method for adjusting image processing conditions for a radiation image as defined in claim 5 wherein said characteristic value is selected from the group consisting of a maximum value of the image signal in said probability density function, a minimum value of the image signal in said probability density function, a maximum value of the image signal in said probability density function, which value represents a maximum amount of light radiated out of a region other than a background region on a recording medium on which the radiation image was recorded, or a mean value of maximum and minimum values of the image signal.

7. An apparatus for adjusting image processing conditions for a radiation image, wherein image processing conditions, under which an image signal representing said radiation image is to be image processed, are adjusted on the basis of the image signal, the apparatus for adjusting image processing conditions for said radiation image comprising:
  i) an operation means for creating a probability density function of the image signal, detecting a predetermined characteristic value of the image signal from said probability density function, and calculating a value of a difference between said characteristic value and each of values of the image signal in said probability density function, said calculation being carried out for the whole image signal,
  ii) a neural network for receiving information representing the values of the differences, which have been calculated by said operation means for the whole image signal, and generating outputs, which represent temporary image processing conditions, in accordance with said values of said differences, and
  iii) a correction means for correcting said temporary image processing conditions, which have been obtained from said neural network, in accordance with a level of said characteristic value.

8. An apparatus for adjusting image processing conditions for a radiation image as defined in claim 7 wherein said characteristic value is selected from the group consisting of a maximum value of the image signal in said probability density function, a minimum value of the image signal in said probability density function, a maximum value of the image signal in said probability density function, which value represents a maximum amount of light radiated out of a region other than a background region on a recording medium on which the radiation image was recorded, or a mean value of maximum and minimum values of the image signal.

9. A radiation image analyzing method, wherein a subdivision pattern of radiation images, a shape and location of an irradiation field, an orientation in which an object was placed when an image of the object was recorded, and/or a portion of the object the image of which was recorded is determined on the basis of an image signal representing a radiation image of the object, the radiation image analyzing method comprising the steps of:
   i) creating a probability density function of the image signal,
   ii) detecting a predetermined characteristic value of the image signal from said probability density function,
   iii) calculating a value of a difference between said characteristic value and each of values of the image signal in said probability density function, said calculation being carried out for the whole image signal,
   iv) feeding information representing the values of the differences, which have been calculated for the whole image signal, into a neural network, which receives said information representing said values of said differences and generates outputs representing temporary results of the determination with respect to the radiation image, information representing said temporary results of the determination being thereby fed out from said neural network, and
   v) correcting said temporary results of the determination, which have been obtained from said neural network, in accordance with a level of said characteristic value, whereby final results of the determination are obtained.

10. A radiation image analyzing method as defined in claim 9 wherein said characteristic value is selected from the group consisting of a maximum value of the image signal in said probability density function, a minimum value of the image signal in said probability density function, a maximum value of the image signal in said probability density function, which value represents a maximum amount of light radiated out of a region other than a background region on a recording medium on which the radiation image was recorded, or a mean value of maximum and minimum values of the image signal.

11. A radiation image analyzing apparatus, wherein a subdivision pattern of radiation images, a shape and location of an irradiation field, an orientation in which an object was placed when an image of the object was recorded, and/or a portion of the object the image of which was recorded is determined on the basis of an image signal representing a radiation image of the object, the radiation image analyzing apparatus comprising:
   i) an operation means for creating a probability density function of the image signal, detecting a predetermined characteristic value of the image signal from said probability density function, and calculating a value of a difference between said characteristic value and each of values of the image signal in said probability density function, said calculation being carried out for the whole image signal,
   ii) a neural network for receiving information representing the values of the differences, which have been calculated by said operation means for the whole image signal, and generating outputs, which represent temporary results of the determination with respect to the radiation image, in accordance with said values of said differences, and
   iii) a correction means for correcting said temporary results of the determination, which have been obtained from said neural network, in accordance with a level of said characteristic value.

12. A radiation image analyzing apparatus as defined in claim 11 wherein said characteristic value is selected from the group consisting of a maximum value of the image signal in said probability density function, a minimum value of the image signal in said probability density function, a maximum value of the image signal in said probability density function, which value represents a maximum amount of light radiated out of a region other than a background region on a recording medium on which the radiation image was recorded, or a mean value of maximum and minimum values of the image signal.

* * * * *